Dec. 5, 1950        W. W. SLOANE        2,532,342

FLUID OPERATED LIFTING DEVICE

Filed Dec. 18, 1947        2 Sheets-Sheet 1

INVENTOR.
William W. Sloane
BY Clarence F. Poole
ATTORNEY

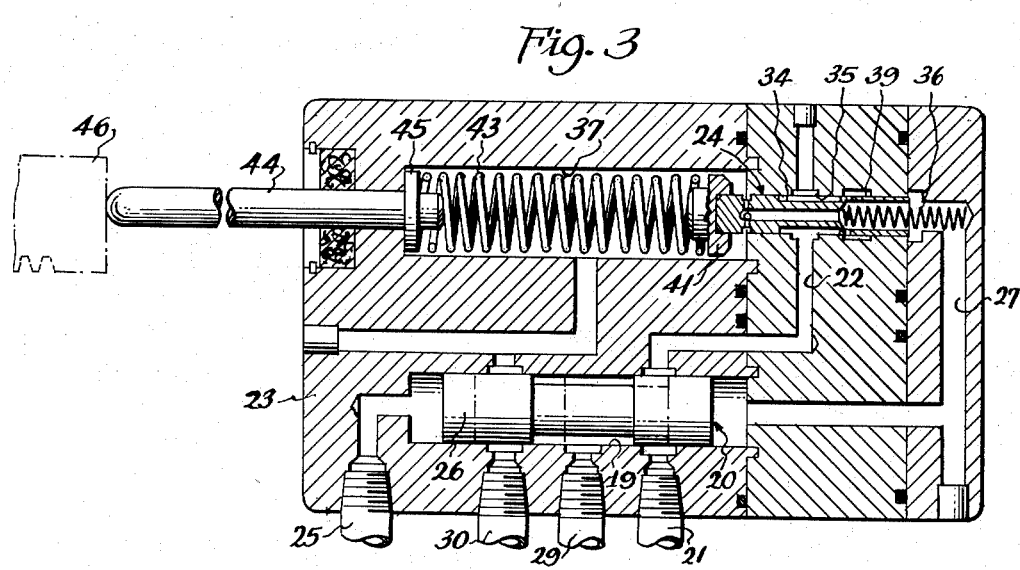
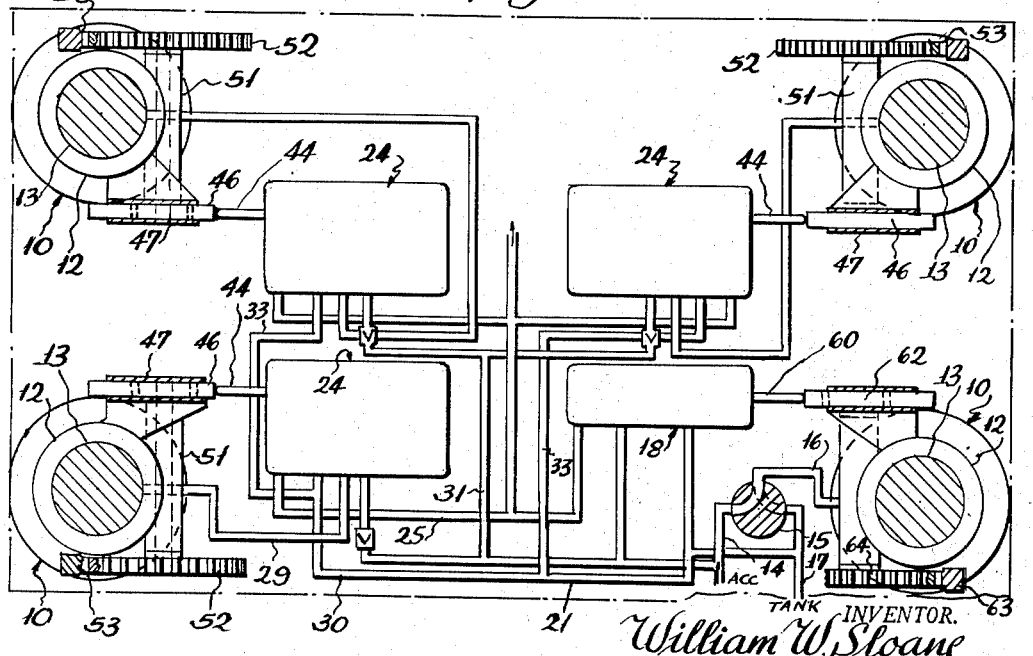

Patented Dec. 5, 1950

2,532,342

UNITED STATES PATENT OFFICE 2,532,342

FLUID OPERATED LIFTING DEVICE

William W. Sloane, Chicago, Ill., assignor to Goodman Manufacturing Company, Chicago, Ill., a corporation of Illinois Application December 18, 1947, Serial No. 792,393

10 Claims. (Cl. 60—97)

This invention relates to improvements in fluid operated lifting devices and has as its principal objects to provide a new and improved control mechanism of a novel and simplified form, arranged to effect uniform lifting and lowering movement of a supporting member by means of a plurality of fluid operated motors, and to maintain said supporting member level regardless of the leakage of fluid from any one or more of said motors or the uneven distribution of the load on said supporting member.

In carrying out my invention I provide a plurality of fluid operated motors or jacks for lifting or lowering a supporting member, or for holding said supporting member substantially level in any of its desired positions of elevation, and provide a valve for supplying fluid under pressure to one motor and a variable pressure valve operated by said one motor. I also provide a variable pressure valve operated by each of the other motors. I further arrange said variable pressure valves to give the same pressures when said motors are holding said supporting member in a desired position of elevation and to establish a differential in pressure when one of said motors moves relatively to the other. I also provide a separate shuttle valve connected between said one variable pressure valve and each of said other variable pressure valves and operated by the differential in pressure established by said one variable pressure valve and said other variable pressure valves, with which said shuttle valves are associated, and connect said shuttle valve to supply fluid to or to release fluid from an associated motor when a differential in pressure has been established by said variable pressure valves, and to hold fluid in an associated motor when the pressures given by said variable pressure valves are the same, so said motors will move together and maintain said supporting member substantially level, regardless of an uneven load distribution on said supporting member or the leakage of fluid from any one or more of said motors.

These and other objects of my invention will appear from time to time as the following specification proceeds and with reference to the accompanying drawings wherein:

Figure 3 is an enlarged detail fragmentary diagrammatic view showing in section one of the control valves for controlling operation of one of the motors; and Figure 4 is a diagrammatic plan view of the lifting means shown in Figures 1 and 2, with certain parts thereof shown in horizontal section.

Figure 1:
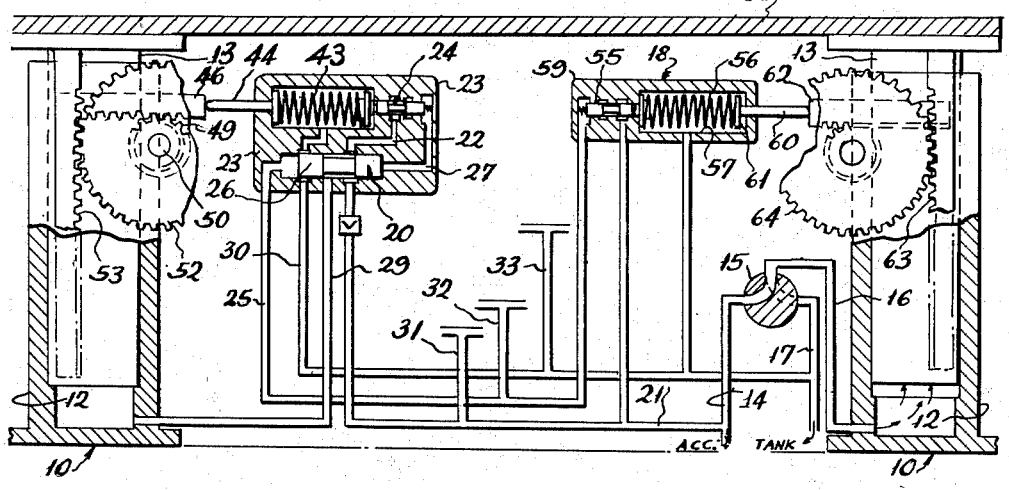
Figure 1 is a view in side elevation with certain parts in section, diagrammatically illustrating one form in which my invention may be embodied.

In the embodiment of my invention illustrated in the drawings, a plurality of fluid operated motors 10, 10 are shown as supporting and as being operable to raise and lower a supporting member 11 which may be the end of a transversely pivoted conveyor, but which for the purpose of simplicity is herein shown as being a platform. Each of said motors is herein shown as consisting of a single acting cylinder 12 having a piston 13 extensible therefrom and having said platform resting thereon.

A pressure line 14 connected with a pump or accumulator (not shown) of a fluid pressure system, is provided to supply fluid under pressure to said system. Said pressure line is connected with a three-way valve 15 which may be of any well known form, for controlling the admission of fluid to and the release of fluid from one cylinder 12, which will herein be referred to as the right-hand cylinder although it may be any one of said cylinders. A pressure line 16 connects said valve with the head end of said right-hand cylinder. Fluid is released from said right-hand cylinder through said three-way valve and a return line 17, connected from said valve to a suitable fluid storage tank (not shown).

The pressure line 14 is also connected with a variable pressure valve 18, operated by vertical movement of the right-hand piston 13 within its cylinder, and with a valve chamber 19 of a shuttle valve 20, by means of a pressure line 21. A pressure passageway 22 in a block 23 for said shuttle valve, connects said pressure line 21 with a variable pressure valve 24, herein shown as being mounted in said valve block 23 and as being operated by vertical movement of the left-hand piston 13, for supplying fluid under pressure to said variable pressure valve.

A pressure line 25 connects the variable pressure valve 18 to the left-hand end of the valve chamber 19, for supplying fluid under pressure thereto, to urge a piston 26 of said shuttle valve to move to the right. A passageway 27 in the valve block 23 connects the variable pressure valve 24 with the right-hand end of the valve chamber 19, and supplies fluid under pressure thereto, to urge said valve piston to move to the left. A pressure line 29 leads from the valve chamber 19, intermediate its ends, to the head end of the left-hand cylinder 12, for supplying fluid under pressure thereto to extend its piston 13 therefrom. A return line 30 connects the left-hand portion of the valve chamber 19 with the return line 17 for returning fluid from the left-hand cylinder 12, during the lowering operation and for returning fluid from the variable pressure valve 24.

Where the supporting member being lifted consists of a transversely pivoted conveyor, it is only necessary to use two motors to lift it, but where more than two motors are used to lift the supporting member, as in Figure 4, a pressure line 31 with branch lines extending therefrom may connect the pressure line 21 to other shuttle valves 20, 20, and to other variable pressure valves 24, 24; a pressure line 32 may connect the pressure line 25 to other shuttle valves 20, 20; and a return line 33 may connect the return from said shuttle valves to the return line 30. While any number of motors 10, 10 may be used to lift the supporting member 11, and may be operated in accordance with my invention from a variable pressure valve like the variable pressure valve 18, for the sake of simplicity, the circuit and operation of two of said motors only will herein be shown and described in detail.

The variable pressure control valve 24 may be a well known form of brake valve commonly used to operate hydraulic apparatus, such as the brakes of a vehicle, and includes a valve piston 34 movable in a valve chamber 35 formed in the valve block 23 (see Figure 3). A spring 36 extends within a hollow inside portion of said valve piston and tends to move said valve piston to the left into a closed position. Said valve piston is drilled from its right-hand end, and the drilled portion thereof communicates with a cross drilled portion adjacent the left-hand end of said piston, adapted to release fluid from the pressure passageway 27 and the right-hand end of the valve chamber 19 into a chamber 37. Said valve piston is also cross drilled adjacent its right-hand end and a cross drilled portion thereof extends through the left-hand portion of a land 39 of said valve piston, at the right-hand end of said piston, to permit fluid to pass from the pressure passageway 22 and the valve chamber 35 through the hollow inside of said valve piston to the pressure passageway 27, for supplying fluid under pressure to the right-hand end of the valve chamber 19, to urge the valve piston 26 to move to the left to a position to hold fluid under pressure in the pressure line 29 and the cylinder 12 connected thereto. A spring seat 41 is mounted on the left-hand end of the valve piston 34 and forms a seat for an operating spring 43 mounted in the chamber 37. The end of said spring opposite from said seat extends along the inner end of a valve rod 44 and abuts a collar or flange 45 secured to said rod, and tends to move said rod to the left. Said valve rod is slidably mounted in the left-hand end of the valve block 23 and extends outwardly therefrom. The outer end of said valve rod is adapted to be engaged by the end of a horizontal rack 46 movable towards and away from said valve 24. Said rack is suitably guided in a horizontal guide 47 spaced outwardly from and secured to an outer wall of the cylinder 12 (see Figure 4). Said rack is meshed with a pinion 49 on one end of a transverse shaft 50, journaled in a bracket 51 formed integrally with said cylinder. A spur gear 52 is mounted on the opposite end of said shaft from the pinion 49 and meshes with a rack 53, secured to the piston 13, for vertical movement therewith.

As the piston 13 moves upwardly, the rack 46 will be moved inwardly towards the valve block 23 at a reduced speed. This will move the valve rod 44 in the same direction and displace the spring 43 to the right and move the valve piston 34 in a direction to permit fluid to pass from the pressure passageway 22 to the pressure passageway 27 and exert pressure against the right-hand end of the valve piston 26 at a pressure substantially equal to the force exerted by said spring. As said piston 13 moves downwardly within said cylinder 12, said rack 46 will move away from said valve block and said spring 43 will be displaced to the left to reduce the pressure against the right-hand end of said valve piston 26.

The variable pressure control valve 18 is similar to the variable pressure control valve 24 so need not herein be shown or described in detail. Said variable pressure control valve includes a valve piston 55 like the valve piston 34 of the valve 24. An operating spring 56 is mounted in a chamber 57, formed in a block 59 for said valve, and is operatively connected with the right-hand end of said valve piston 55, to tend to move said valve piston to the left upon displacement of said spring along said valve block to the left. The end of said spring opposite from said piston extends along a valve rod 60 and abuts a collar 61 on said valve rod. Said valve rod is slidably mounted in the right-hand end of said valve block and its outer end abuts the inner end of a rack 62, slidably guided in the right-hand cylinder 12. A vertical rack 63 operatively connected with the right-hand piston 13 for vertical movement therewith, is provided to rectilinearly move said rack 62, through reduction gearing 64. As the piston 13 moves upwardly with respect to the cylinder 12, the rack 62 will move towards the valve 18 and the spring 56 will be displaced to the left, to open the variable pressure valve 18. When said valve is open, fluid under pressure will pass through the pipe 25 to the left-hand end of the valve piston 26 of the shuttle valve 20, at pressures corresponding to the displacement of said spring, to tend to move said valve piston 26 to the right into the position shown in Figure 1.

In operation of the device, the three-way valve 15 is first turned to the on position shown in Figure 1, to admit fluid under pressure to the head end of the right-hand cylinder 12 to initially extend its piston 13 therefrom. As said piston starts its extensible movement, the operating spring 56 of the variable pressure valve 18 will be displaced to the left. This will supply fluid under pressure to the left-hand end of the valve piston 26 of the shuttle valve 20 through the pressure line 25. At this instant the operating spring 43 of the variable pressure valve 24 will be free and no pressure will be exerted on the right-hand end of said valve piston 26. Said valve piston 26 will then move to the right to the position shown in Figure 1, to admit fluid under pressure to the head end of the left-hand cylinder 12 and cause its associated piston 13 to move vertically with said right-hand piston. As soon as said left-hand piston starts its extensible movement, the operating spring 43 will be displaced to the right, to open the variable pressure valve 24, to supply fluid under pressure to the right-hand end of said valve piston 26.

Since the variable pressure valve 24 comes into operation shortly after operation of the variable pressure valve 18, the pressure exerted on the left-hand end of the valve piston 26 will be greater than that exerted on its right-hand end, and said valve piston will remain in the position shown in Figure 1. The pistons 13, 13 will then move vertically together.

If the left-hand piston 13 should move ahead of the right-hand piston, due to inequalities of the load or leakage past the right-hand piston, the spring 43 will be displaced a greater amount than the spring 56. This will increase the pressure exerted on the right-hand end of the valve piston 26 over the pressure exerted on the left-hand end of said valve piston, and move said valve piston to the left into position to cut off the flow of fluid under pressure from the pressure line 21 until the right-hand piston again catches up with the left-hand piston.

Figure 2:
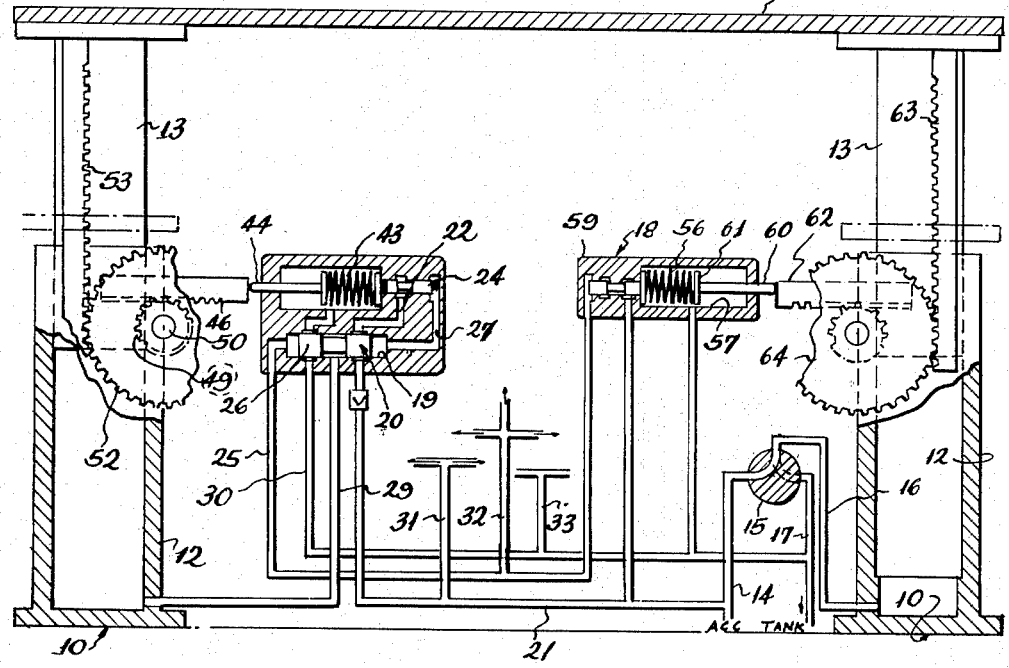
Figure 2 is a view somewhat similar to Figure 1, but showing the platform in an elevated position.

When the right-hand piston 13 has reached its upper limit of travel, the spring 56 will be displaced its maximum regulated amount and the regulated pressure permitted to act on the shuttle valve piston 26 will be at the maximum pressure the spring 56 has been set for. This pressure will cause the shuttle valve piston 26 to move to the right, as shown in Figure 1, and pressurized fluid will pass from the accumulator through line 21 to the throttling opening 19, around the central portion of shuttle valve piston 26, and thence into line 29 to raise the left-hand piston 13. When the left-hand piston 13 is raised, the variable pressure valve 24 will be opened to allow the pressurized fluid in passageway 22 to pass through passageway 27 to the left end of the shuttle valve piston 26. At the instant both pistons 13, 13 are at the upper limits of their travel, the two springs 43 and 56 will be displaced substantially equal amounts and consequently the pressures on both ends of the shuttle valve piston 26 will be substantially equal. The equality of the pressures developed by the variable pressure valves 24 and 18 would normally tend to hold the shuttle valve piston 26 in whichever position it happened to be in at the time these equal pressures were applied if it were not for the leakage effect around that piston. It can readily be seen that when the piston 26 is disposed to the extreme right in chamber 19, as seen in Figure 1, and the pressures on the ends of the piston 26 are equal, that the pressurized fluid at the left-hand end having a shorter distance to travel to the return line 30, will dissipate itself by seeping into the return line 30 quicker than the fluid on the right-hand end of the piston 26, with a resultant unbalancing of the formerly equal pressures. This, of course, will cause the piston 26 to move to the left toward the mid-position shown in Figure 2 until the end pressures on piston 26 are again equal. In this connection it should be noted that a very small differential in the pressures exerted on the ends of piston 26 will cause movement thereof toward the lower pressure.

The movement toward the left will be halted when the left-hand pressure has bled down sufficiently to allow the regulating spring 56 to again crack the variable pressure valve 18 to allow a new supply of pressurized fluid to enter from the line 21 into line 25 and thence to the left-hand end of piston 26 to again move the piston 26 to the right. Likewise, a sufficient decrease in pressure on the right-hand end of the piston 26 will cause the spring 43 to crack valve 24 to bleed in a new supply of pressurized fluid to the right-hand end of the shuttle piston. Thus it will be seen that due to leakage and new supplies of pressurized fluid the piston 26 will tend to assume the mid-position of travel shown in Figure 2, to hold the fluid supplied to the left-hand piston 13 under pressure whenever the pistons 13, 13 are at their upper limits of travel or at any other intermediate level with one another whereby the regulating springs 43 and 56 are displaced equal amounts. If fluid should leak past the valve piston 26 to the return line 30, permitting the left-hand piston 13 to start to move downwardly, the spring 43 will be displaced to the left and the valve piston 26 will be moved to the right to supply fluid to elevate said piston until the pressure on opposite sides of said piston is again the same.

Upon movement of the valve 15 into position to release fluid from the right-hand cylinder 12, the right-hand piston 13 will move downwardly a slight amount, displacing the spring 56 to the right. This will decrease the pressure on the left-hand end of the valve piston 26, while the pressure on the right-hand end of said piston will initially remain the same as formerly. Said valve piston will then be moved by pressure exerted on its right-hand end into an extreme position to the left, to release fluid from the left-hand cylinder 12 through the return line 30.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a multiple lift device, a plurality of fluid operated lifting jacks adapted to support a load in various desired positions of vertical adjustment, valve means for controlling operation of said jacks and causing them to maintain said load at a desired level including a plurality of variable pressure valves operated by said jacks upon vertical movement thereof and so constructed and arranged as to give substantially the same pressures when said jacks are holding said support level in a desired position of vertical adjustment, and to establish a differential in pressure when one of said jacks moves relatively to the other, and a third valve connected with a source of fluid supply and a return, and also connected with one of said jacks, for holding fluid under pressure therein or for supplying fluid thereto or releasing fluid therefrom, said third valve being connected with and operated by the differential in pressure established by said variable pressure valves to supply fluid to hold fluid in or to release fluid from an associated jack.

2. In a fluid operated lifting device, load supporting means comprising a plurality of fluid operated lifting jacks, means for controlling operation of said jacks and causing them to maintain level support including a fluid pressure line, a valve for controlling the admission of fluid under pressure from said pressure line to one of said jacks, separate valve means individually associated with each of said jacks, each such valve means being operatively responsive to a predetermined vertical movement of its associated jack, and a shuttle valve operated by said valve means for supplying fluid to or releasing fluid from or holding fluid in the other of said jacks, depending upon the rate of movement of said other jack with respect to said first jack.

3. In a fluid operated lifting device, load supporting means comprising a plurality of fluid operated lifting jacks, means for controlling operation of said jacks and causing them to maintain said supporting level and to move said support in a plurality of substantially horizontal planes including a fluid pressure line, a valve for controlling the admission of fluid under pressure from said pressure line to one of said jacks, individual variable pressure valve means associated with each of said jacks and operatively responsive to a predetermined vertical movement of each of said jacks and adapted to establish a differential in pressure when said jacks move with respect to each other, and a shuttle valve operated by the differential in pressure established by said variable pressure valves for supplying fluid to or releasing fluid from the other of said motors depending upon movement of said other motor with respect to said first motor.

4. In a fluid operated lifting device, load supporting means comprising a plurality of fluid operated lifting jacks, means for controlling operation of said jacks and causing them to maintain level support and to move said supported load vertically through a succession of substantially horizontal planes including a fluid pressure line, a valve for controlling the admission of fluid under pressure from said pressure line to one of said jacks, valve means responsively operable by a predetermined and regulated vertical movement of said one jack, a fluid connection from said pressure line for supplying fluid under pressure to said valve means, other like valve means operated at a predetermined amount of vertical movement of another of said jacks, a fluid connection from said pressure line to said other valve means, and a shuttle valve for supplying fluid under pressure to said other jack, said shuttle valve being moved by pressure supplied by said first valve means to a position to supply fluid under pressure to said other jack, and being moved by pressure supplied by said other valve means to release fluid under pressure from said other jack and being moved to a position to hold pressure in said other jack when the pressure given by said first and second valve means is the same.

5. In a fluid operated lifting device, load supporting means comprising a plurality of fluid operated lifting jacks, means for controlling operation of said jacks and causing them to maintain level support and to move said supported load through substantially horizontal planes including a fluid pressure line, a valve for controlling the admission of fluid under pressure from said pressure line to one of said jacks, valve means responsively operable by a predetermined and regulated vertical movement of said one jack, a fluid connection from said pressure line for supplying fluid under pressure to said valve means, other like valve means responsively operated by a predetermined vertical movement of another of said jacks, a fluid connection from said pressure line to said other valve means, a shuttle valve, a fluid connection from said pressure line to said shuttle valve for supplying fluid under pressure thereto, a fluid connection from said shuttle valve to said other jack for supplying fluid under pressure thereto, and fluid pressure connections from said valve means to opposite ends of said shuttle valve, for moving said shuttle valve into positions to supply fluid to or to release fluid from the other of said jacks when one jack is moving relatively to the other, and to hold pressure in said other jack when it is desired to hold said support in a desired position of vertical adjustment.

6. In a fluid operated lifting device, load supporting means comprising a plurality of fluid operated lifting jacks, means for controlling operation of said jacks and causing them to maintain level support and to move said support through successive substantially horizontal planes including a fluid pressure line, a valve for controlling the admission of fluid under pressure from said pressure line to one of said jacks, variable pressure valve means responsively operated by a predetermined vertical movement of said one motor, other like variable pressure valve means operated by vertical movement of another of said jacks, fluid connections from said pressure line to said variable pressure valve means, for supplying fluid under pressure thereto, said variable pressure valve means being adapted to establish a differential in pressure when said jacks move relatively with respect to each other, a shuttle valve operated by the differential in pressure established by said variable pressure valve means for supplying fluid under pressure to or for releasing fluid under pressure from said other jack, dependent upon the vertical position of said other jack with respect to said first jack.

7. In a fluid operated lifting device, load supporting means comprising a plurality of fluid operated lifting jacks, means for controlling operation of said jacks and causing them to maintain level support and to move said supported load through substantially horizontal planes including a fluid pressure line, a valve for controlling the admission of fluid under pressure from said pressure line to one of said jacks, variable pressure valve means responsively operable by a predetermined and regulated vertical movement of said one motor, other variable pressure valve means responsively operated by vertical movement of another of said jacks, fluid connections from said pressure line to said variable pressure valve means for supplying fluid under pressure thereto, said variable pressure valve means being adapted to establish a differential in pressure when said jacks move relatively with respect to each other, a shuttle valve, a fluid pressure connection from said pressure line to said shuttle valve for supplying fluid under pressure thereto, a fluid pressure connection from said shuttle valve to said other jack for supplying fluid under pressure thereto, a return connection from said shuttle valve for releasing fluid under pressure from said other jack, and fluid connections from said variable pressure valve means to opposite ends of said shuttle valve, to operate said shuttle valve by the differential in pressure established thereby, to supply fluid to, release fluid from, or hold fluid in said other jack dependent upon the vertical position of said second jack with respect to said first jack.

8. In a fluid operated lifting device for raising and lowering a load through successive horizontal levels, a plurality of fluid operated lifting jacks each including a fluid holding cylinder and a lifting piston, a pressure line for supplying pressurized fluid, a control valve for controlling the admission of fluid from said line to one of said jacks, a variable pressure control valve for differentiating the pressures supplied by said supply line, means for responsively operating said variable pressure control valve by vertical movement of said one jack, other variable pressure control valve means associated with and responsive to the vertical movement of said other jacks, a shuttle valve associated with each of said other variable pressure valve means and fluid pressure connections from said line to said other variable pressure and shuttle valves.

9. In a fluid operated lifting device for raising and lowering a load through successive horizontal levels, a plurality of fluid operated lifting jacks each including a fluid holding cylinder and a lifting piston, a pressure line for supplying pressurized fluid from a supply source, a control valve for controlling the passage of pressurized fluid from said line to and from one of said jacks, a variable pressure control valve for differentiating the pressures supplied by said supply line, and rack and pinion means for responsively operating said variable pressure control valve by vertical movement of said one jack whereby an incremental vertical movement of said jack will cause a responsively predetermined incremental movement of said variable pressure control valve to thereby develop said differential pressures.

10. In a fluid operated lifting device for raising and lowering a load through successive horizontal levels, a plurality of fluid operated lifting jacks each including a fluid holding cylinder and a lifting piston, a pressure line for supplying pressurized fluid from a supply source, a control valve for controlling the passage of pressurized fluid from said line to and from one of said jacks, a variable pressure control valve for differentiating the pressures supplied by said supply line, rack and pinion means for responsively operating said variable pressure control valve by vertical movement of said one jack whereby an incremental vertical movement of said jack will cause a responsively predetermined incremental movement of said variable pressure control valve to thereby develop said differential pressures, like additional variable pressure control valve means associated with and similarly responsive to the vertical movement of said other jacks, a shuttle valve associated with each of said other variable pressure valves and operatively responsive to said differential pressures developed by said variable pressure valves, for emitting, discharging, or holding pressurized fluid in said other jacks, and all of said valves and jacks being co-actively connected by suitable fluid pressure connections.

WILLIAM W. SLOANE.

REFERENCES CITED

The following references are of record in the file of this patent:

UNITED STATES PATENTS

| Number | Name | Date |
|---|---|---|
| 1,962,924 | Bristol | June 12, 1934 |
| 2,312,726 | Munro | Mar. 2, 1943 |
| 2,378,497 | Phillips | June 19, 1945 |